Patented Aug. 15, 1950

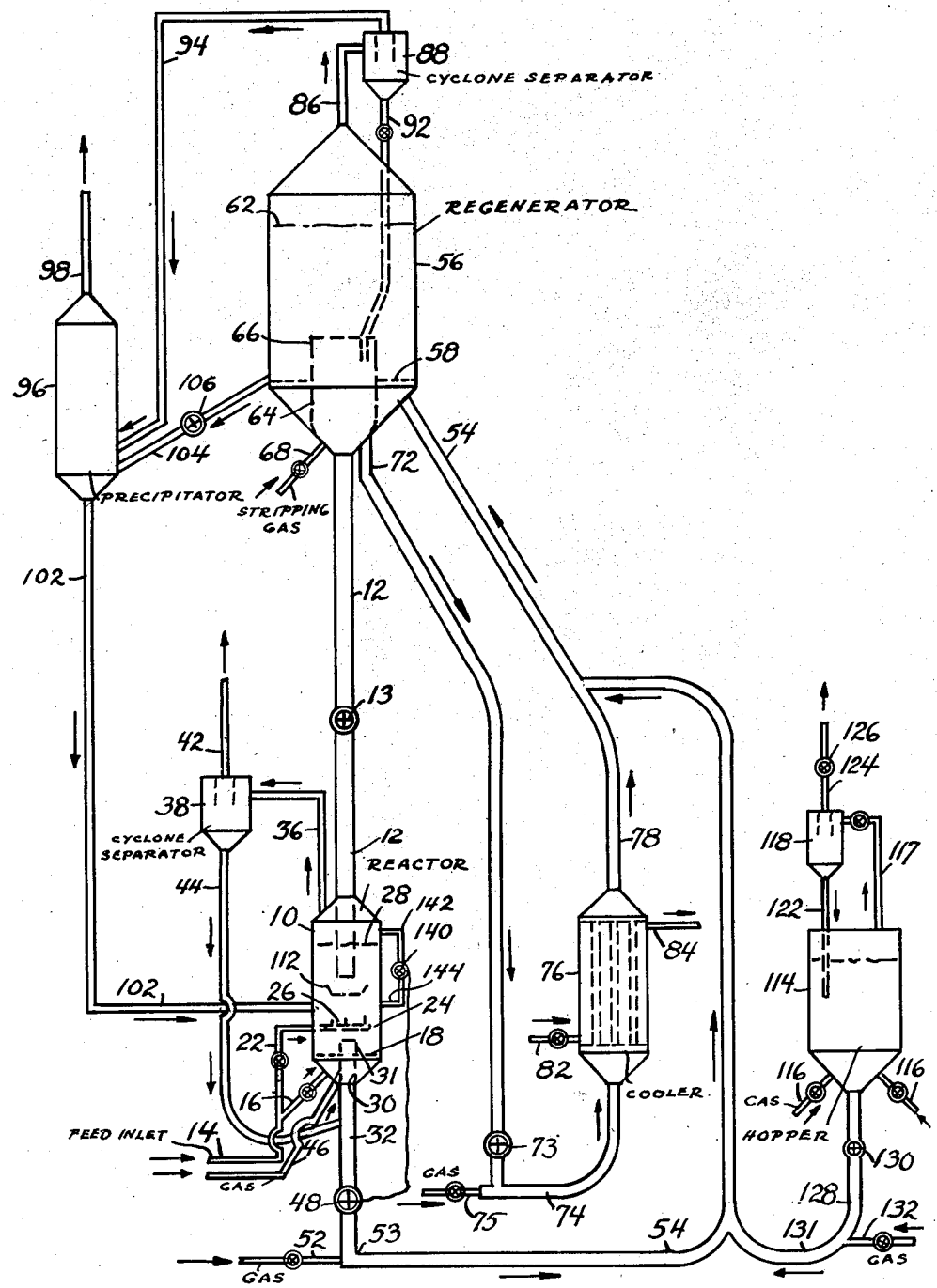

2,518,693

UNITED STATES PATENT OFFICE 2,518,693

PROCESS AND APPARATUS FOR CONTACTING FINELY DIVIDED SOLIDS AND GASES

Charles E. Jahnig, Roselle, N. J., assignor to Standard Oil Development Company, a corporation of Delaware Application July 24, 1941, Serial No. 403,829

7 Claims. (Cl. 196—52)

This invention relates to catalytic reactions and more particularly relates to catalytic conversion of hydrocarbons.

In processes using catalyst in powder form, it is generally the practice to mix the catalyst with reactant vapors or gases and pass the mixture as a suspension through an enlarged reaction vessel taking the reaction products and spent catalyst overhead and then separating the spent catalyst from the reaction products in vapor form. With this type of process it is necessary to use a plurality of separating units to recover the catalyst particles from the suspending gases. For example, when cyclone separators are used there is a relatively large pressure drop through the cyclone separators due to the relatively high concentration of catalyst in the suspension and in addition some of the catalyst particles are lost from the system.

Where standpipes are used for transferring the catalyst from a low pressure zone to a zone of higher pressure, it is necessary to have a long vertical column of catalyst powder in a standpipe. By adding a small amount of aeration gas to the standpipe at various points, the mass of catalyst is maintained in a fluid state, so that pressure is built up due to the weight of material in the column. The standpipe is made high enough to provide a pressure at the bottom sufficient to convey the catalyst through the system.

According to my invention, the number of separating units used is reduced and the standpipe height is reduced so that less structural material is required. According to my invention, the catalyst particles in a relatively dense suspension are removed as such from the bottom of the reaction zones. In a catalytic conversion operation such as catalytic cracking of hydrocarbons the catalyst becomes inactivated due to the deposition of carbonaceous material on the catalyst particles. The larger portion of the spent or partially spent catalyst particles is removed from the bottom of the reactor and passed to the regeneration zone where the catalyst is regenerated by burning with air or other oxidizing agent.

During regeneration it is necessary to control the operation so that excessively high temperatures are avoided. The regenerated catalyst particles in a dense suspension are removed from the bottom of the regeneration zone and returned to the reactor for reuse in further catalytic conversions. The major portion of the catalyst particles is removed from the bottom of the reaction zones so that less catalyst passes overhead with the vapors or gases and in this way fewer separating units are necessary for obtaining the desired separation of solid particles from gases or vapors.

The velocity of the vapors or gases passing through the reaction zones is so controlled or adjusted to maintain a body of catalyst particles in these zones. The catalyst mass is aerated and simulates a liquid in that it is mobile and has a level within each reaction zone. With the velocity at the desired figure the catalyst masses in the reaction zones form relatively dense suspensions. By removing the catalyst as a dense suspension from the bottom of a reaction zone the relatively dense suspension is used as such without the necessity of passing through separating means.

The reaction products in vapor form leave the top of the reactor and carry some catalyst particles with them. These reaction products are passed through a separating means for removing most of the remaining solid catalyst particles from vapors and gases. As the reaction products still contain traces of catalyst particles, they can be passed through a scrubbing tower or other device to recover the particles. By removing most of the catalyst from the bottom of the reactor in a relatively dense suspension, fewer separating units such as cyclone separators are required, and due to the relatively low concentration of catalyst in the vapors and gases, there is a much lower pressure drop through the separators.

The regeneration gases from the regeneration zone also carry a small amount of catalyst particles from the regeneration zone and the regeneration gases are passed through a separating means for recovering the catalyst particles. As most of the regenerated catalyst is taken from the bottom of the regeneration zone as a relatively dense suspension, the amount of catalyst particles going overhead is relatively small, less separating equipment is needed to effect the desired separation of catalyst particles and lower pressure drops are obtained across the separators.

In the preferred form of my invention the regeneration zone is placed above the reactor so that the reactor is under a greater pressure than the regeneration zone. Using this arrangement the gas for regeneration can be compressed to a somewhat lower pressure. The higher pressure in the reactor is used to force the products through heat exchangers, fractionating towers, or other equipment. It should be understood that other arrangements of the apparatus are within the scope of my invention. For example, the reactor may be located above the regenerator, or it may be located to one side. Also, both reactor and regenerator may be operated at essentially the same pressure. The relatively dense suspension leaves the reaction zones through standpipes and the body of relatively dense suspension of catalyst in each of the reaction zones forms part of the respective standpipes to provide the necessary pressure for circulating the catalyst through the system. In this process the fluid static head due to the catalyst in the reaction zones acts to increase the pressure built up in the standpipes, whereas in a system where all of the catalyst is taken overhead, this fluid static head must be counterbalanced by additional standpipe height. Because of this, and because of the lower pressure drop through the cyclones as described before, shorter standpipes may be used with the process described herein.

Referring now to the drawing, the figure represents one form of apparatus which may be used to carry out my invention.

Referring now to the drawing, the reference character 10 designates an enlarged vessel or reactor into which catalyst or contact material in powder form is introduced through standpipe 12 which is shown in the drawing as extending through the top of the reactor 10. The standpipe 12 has a control valve 13. The reactants in vapor or gas form are passed through line 14 and introduced into the bottom portion of the reactor through line 16. The line 16 introduces the reactants below the grid 18. Instead of introducing the reactants through line 16, the reactants may be passed through line 22 and into the body of catalyst or contact material 24 in the reactor 10 by means of nozzles 26 or the like. In the latter case a small amount of aeration gas may be added at the bottom of the reactor to maintain the catalyst or contact material in a fluidized condition.

The reactant gases are introduced into the reactor 10 at such a velocity as to maintain a body of catalyst or contact material in fluidized condition in the reactor and the fluidized mass has a level 28 similar to the level of a liquid in a vessel. The level 28 is generally not a quiescent level as shown in the drawing but is more like the surface of a violently boiling liquid, as vaporous reaction products are continuously leaving the surface of the fluidized mixture and these vaporous products carry with them overhead some of the finely divided contacting material. In the space above the level 28 the catalyst or solid particles are carried in a dilute phase or in a concentration much less than the concentration of the solid particles in the dense phase below level 28.

The maintenance of this level is an essential feature of my invention and the method of controlling the level will be described later. While the catalyst or contact particles are in the reactor 10, they are maintained in a turbulent condition so that intimate contact is provided between the catalyst or contact particles and the reactants and a substantially uniform temperature is maintained in the reactor 10.

In many reactions the catalyst or contact particles become partially or wholly inactivated after contact with reactants for a certain time and it is necessary to regenerate them before using them further. According to my invention, the catalyst or contact particles are removed from the bottom of the reactor 10 as a relatively dense fluidized mass or mixture. The dense catalyst or contact suspension or mixture is withdrawn from a well or reservoir 30 which extends above the grid 18 for a short distance as at 31 into the dense mixture of solid particles. The well 30 communicates with standpipe 32 which extends below reactor 10. The further treatment of the withdrawn catalyst or contact material will be presently described.

The products of reaction in vapor form leave the upper portion of the reactor 10 through line 36 and carry with them a relatively small amount of catalyst or contact particles. The reaction products are passed into a separating means 38 such as a cyclone separator for separating residual catalyst particles from the reaction products. More than one cyclone separator may be used, if desired. The reaction products pass overhead through line 42 and are further treated as, for example, in suitable fractionation equipment to separate desired motor fuel in the gasoline boiling range from condensate oils. The separated solid particles are withdrawn from the bottom of the separating means 38 and passed through line 44 to the standpipe 32 which is used to withdraw spent or partially spent solid particles from the reactor 10. Or the separated solid particles from line 44 may be introduced into well 30.

The spent or partially spent catalyst or contact particles in the standpipe 32 are stripped by introducing stripping gas such as steam through line 46, preferably into the lower portion of the well 30. Or the stripping gas may be introduced into standpipe 32 and above the slide valve 48. The valve 48 is provided at the bottom portion of the standpipe 32 for controlling the rate of withdrawal of catalyst or solid particles from the reactor 10. It is by means of valve 48 that the level 28 of the dense catalyst phase in the reactor is maintained at a desired point. The level can be lowered by opening valve 48 to a greater extent so that the rate of removal of catalyst from the reactor 10 through standpipe 32 and line 53 is greater than the rate at which it is added to the reactor through standpipe 12. To raise the level, valve 48 is moved toward closed position so that catalyst flows into the reactor 10 faster than it is removed from the reactor and hence the level 28 builds up. By proper control of valve 48, the level may be held at any desired point.

The extent of reaction depends on the catalyst rate as set by valve 13 in standpipe 12 and also on the level 28 in the reactor 10, a higher level tending to give more reaction. As these two variables are independently controlled, a high degree of flexibility is provided.

The regeneration of the catalyst or solid particles will now be described. The relatively dense suspension leaving the standpipe 32 is mixed with a regenerating gas such as air or other gaseous oxidizing agent, combustion gases containing oxygen, or hydrogen or carbon dioxide, etc., introduced through line 52 into a mixing zone 53 below valve 48. The fluidized mass of catalyst or solid particles and regenerating gas has a lower density than the fluidized material in standpipe 32 and is passed through line 54 and introduced into the bottom portion of a regeneration zone 56 and below the grid 58 arranged in the bottom portion of the regeneration zone by the pressure produced in the column of dense catalyst suspension in standpipe 32.

The regeneration zone is formed as an enlarged vessel. The velocity of the gases in the regeneration zone is such that the body of catalyst or solid particles in the regeneration zone is maintained as a relatively dense fluidized mass having a level 62. The level 62 is similar to level 28 in reactor 10 described above in that it simulates a violently boiling liquid. The space above level 62 has a much lower concentration of catalyst or contact particles than the dense fluidized mass having the level 62 and may be termed a dilute phase. In the regeneration zone the catalyst or contact particles are maintained in a turbulent condition so that intimate contact is provided between the catalyst or contact particles and the regenerating gas or agent. Due to the turbulent condition, the temperature throughout the mass of catalyst or contact material undergoing regeneration is substantially uniform.

Within the bottom portion of the regeneration zone 56 a well or reservoir 64 is provided which extends above the grid 58 for a short distance as indicated by the reference character 66. The top of the well 66 may be located anywhere within the dense catalyst phase and this is also true for well 30 in the reactor. The reservoir or well 64 empties into the standpipe 12 hereinbefore described for conveying regenerated catalyst or contact particles to the reactor 10. The standpipe 12 is provided with the valve 13 above described to control the amount of catalyst or contact particles passing to the reactor 10. Stripping gas such as steam is introduced into the bottom portion of the well 64 through line 68. One or more inlet lines 68 may be provided. The stripping gas is used to remove any remaining regenerating gas or agent remaining in the regenerated catalyst or contact particles.

Where the regeneration treatment is an exothermic reaction, it is necessary to maintain the temperature during regeneration below a temperature which is harmful to the catalyst or contact particles and some means must be provided to prevent the temperature from rising too high. In the preferred form of my invention hot regenerated catalyst or contact particles are withdrawn from the well or reservoir 64 during regeneration in a relatively dense phase, cooled and returned to the regenerator 56. For this recycling of regenerated catalyst a line 72 is provided which communicates with the bottom portion of the well or reservoir 64 for withdrawing regenerated catalyst or contact particles in a relatively dense suspension. The line 72 comprises a standpipe provided with a valve 73 at its bottom portion for controlling the amount of catalyst or contact particles withdrawn through line 72. A suitable suspending gas such as air, steam or the like is introduced into line 74 through line 75 where it is mixed with the regenerated catalyst or contact particles introduced into line 74 from the standpipe 72. By mixing the suspending gas with the relatively dense suspension, a lighter or less dense suspension results which is forced upwardly and returned to the bottom portion of the regeneration zone by the pressure produced by the more dense catalyst or solid particle suspension in standpipe 72.

The lighter suspension passes through line 74 and upwardly through a cooler 76 for reducing the temperature of the catalyst or contact particles and the cooled catalyst or contact particles are then passed through line 78 and through line 54 where they are mixed with spent or partially spent catalyst and this mixture is introduced into the bottom portion of the regeneration zone below the grid 58. Or the lighter suspension may be passed through line 78 directly into the regenerator 56 below grid 58. The cooler 76 is provided with an inlet 82 and an outlet 84 for circulating a heat exchange medium through the cooler.

Returning now to the regeneration zone 56, the regeneration gases pass overhead through line 86. Most of the regenerated catalyst or contact material is withdrawn from the bottom of the regeneration zone 56 through well 64 in a relatively dense condition. However, some of the catalyst or contact particles pass overhead with the regeneration gases and in order to remove these catalyst or contact particles the suspension is passed through a separating means 88 which is shown on the drawing as a cyclone separator but other separating means may be used, or more than one cyclone separator may be used. The separated catalyst or contact particles are returned to the well or reservoir 64 in the regeneration zone 56 through line 92. If desired, the separated particles in line 92 may be directly returned to the body of the catalyst or contact mass in the regenerator 56.

The separated regeneration gases pass overhead through line 94. The regeneration gases after passing through the separating means 88 still contain some relatively fine catalyst or contact particles and in order to separate additional amounts of catalyst or contact particles, the regeneration gases are passed through an electric precipitator 96. The separated gases pass overhead through line 98 and are vented to the atmosphere or may be treated for the recovery of contained heat or traces of catalyst or contact particles. The separated catalyst fines or contact particles are withdrawn from the bottom of the precipitator 96 through line 102 and introduced into the body of catalyst or contact material 24 in the reactor 10. Or the catalyst or contact particles may be introduced into standpipe 12 above or below valve 13 or into standpipe 32 or line 54. Moreover this catalyst may be returned to regenerator 56 or to separator 88.

The catalyst or contact fines separated in the electric precipitator 96 have poor flow characteristics and it is preferred to mix relatively coarse particles with the catalyst fines or contact particles to form a mixture which will have better flow characteristics than the fines alone. A line 104 having a valve 106 is provided for withdrawing catalyst or contact particles from the bottom portion of the regeneration zone 56 and for introducing the catalyst or contact particles into the bottom portion of the electric precipitator 96. If desired, the particles may be withdrawn from well 64.

In the reactor 10 a dish shaped member 112 is provided below the discharge end of the standpipe 12 to prevent reactant vapors from passing upwardly through the catalyst or contact particles in the standpipe 12.

During the operation of the process, a certain amount of the catalyst or contact particles is lost in the gases leaving the system. It is necessary to add make-up catalyst or contact particles to the system to maintain the proper amount of catalyst or solid particles. I have provided a hopper 114 which is maintained under a pressure somewhat higher than that used in reaction. The catalyst or contact material in powder form in the hopper 114 is maintained in a fluidized condition by the introduction of fluidizing gas such as steam into the bottom portion of the hopper through line 116. Preferably more than one inlet line 116 is provided so that the entire mass of finely divided catalyst or contact material is fluidized. Excess gas is removed from the top of the hopper 114 through line 117 and is passed through a separating means 118 for separating finely divided catalyst or contact particles from the gas. The separated catalyst or contact particles are returned to the hopper through line 122 which extends below the level of the solid particles in the hopper 114. The separated gases are passed through line 124 provided with a pressure control valve 126.

The make-up catalyst or contact particles under pressure and in fluidized condition are withdrawn from the bottom of the hopper 114 through line 128 provided with a control valve 130 and introduced into line 131 where it is mixed with air or other suitable gas introduced through line 132. The make-up catalyst or solid contact particles in suspension are then passed through line 131, mixed with spent catalyst or contact particles passing through line 54 and this mixture is mixed with cooled regenerated catalyst or contact particles passing through line 78 and the entire mixture is introduced into the regeneration zone 56 below grid 58 where the make-up catalyst or contact material is brought up to the proper temperature. If desired, the make-up catalyst or contact particles may be introduced into the regeneration zone 56 below grid 58 as a separate stream.

As an example of my invention the catalytic cracking of hydrocarbons will be described. In the catalytic cracking of hydrocarbons, the hydrocarbons in vapor or gas form are introduced either through line 16 or through line 22 into the reactor 10 where they are contacted with catalyst powder. The catalyst powder may be any suitable cracking catalyst but preferably is an activated or acid treated finely divided bentonite clay containing substantially no particles greater than 100 microns and preferably with less than 40% in the range of 0 to 20 microns. The velocity of the feed vapors or gases is so controlled that the body of catalyst is maintained in a fluidized condition and has a relatively high density. For example, the velocity of the outgoing vapors or gases passing into line 36 is preferably maintained between about 0.5 feet to 3 feet per second and the density of the catalyst in the reactor 10 will be about 10 to 30 pounds per cubic foot in the lower portion of the reactor 10 below level 28 and only a fraction of this density at the point where the gases leave the reactor 10 through line 36. The dispersed phase above level 28 will have a density of about .05 to 0.4 pound per cubic foot. Velocities somewhat higher or lower than these may be used if desired. The velocity of the stripping gas introduced through line 46 is about 0.1 to 1.0 feet per second.

During the cracking operation, the reactor 10 is maintained at a temperature of about 800° F. to 1000° F. and during the reaction carbonaceous material is deposited on the catalyst particles. The catalyst particles are withdrawn by means of well 30 and the standpipe 32 and passed through the regeneration zone 56 where they are regenerated by burning off the carbonaceous material with air or other suitable oxidizing agent.

In the regeneration zone 56 the velocity of the gases is so controlled that the density of the catalyst in the regeneration zone is maintained at about 10 to 30 pounds per cubic foot in the dense phase below level 62. The catalyst particles are in a fluidized condition and are withdrawn as a relatively dense suspension from the bottom portion of the regeneration zone 56 by means of the well or reservoir 64.

During regeneration, the temperature is preferably held below about 1150° F. when acid activated bentonite clays are being regenerated. In order to control the temperature, some of the regenerated catalyst is withdrawn from the well 64, cooled by passing through the cooler 76 and the cooled regenerated catalyst is returned to the regeneration zone 56. Intimate mixing of the cooled catalyst and the catalyst undergoing regeneration is quickly effected due to the mixing in the regenerator and in this way the temperature is controlled during regeneration. It will be noted that the catalyst used for controlling the regeneration temperature never passes through the cyclones so that no loss is sustained on this stream.

The catalyst particles as a relatively dense suspension in the regeneration zone 56 form part of the standpipe 12 so that the pressure developed at the bottom of the standpipe 12 is equivalent to a column of catalyst extending from the bottom of the standpipe 12 to the level 62 of the body of catalyst in the regeneration zone 56. By using a part of the regeneration zone as the standpipe, the height of the standpipe is reduced.

The regeneration zone 56 is preferably arranged above or at a higher level than the reactor 10. In this way the reactor 10 operates under a higher pressure than the regeneration zone 56. The catalyst particles as a relatively dense suspension in the reactor 10 are maintained under a higher pressure than the dense suspension in the regeneration zone 56. For example, the regenerating vessel 56 may be substantially at atmospheric pressure and the reactor 10 will be at a pressure of about 8 pounds per square inch. These pressures are by way of example only and my invention is not to be restricted thereto. By having the reactor under a slight pressure, the reaction products are carried to suitable equipment for further treatment as a fractionation system. Where it is desired to have the regenerator at a higher pressure than atmospheric pressure, the pressure in the reactor 10 will be correspondingly increased.

In the reactor the relatively dense suspension of catalyst having a level at 28 forms part of the standpipe 32 for providing pressure by a fluidized column. As the reactor 10 is at a higher pressure than the regenerator 56, only a short standpipe 32 is required to return the spent catalyst to the regeneration zone.

While I have shown the standpipe 12 as extending through the top of the reactor and into the body 24 of catalyst in the reactor 10, it is to be understood that this construction may be varied and the standpipe 12 may be located outside of the reactor 10. For example, the standpipe 12 may be arranged to introduce the regenerated catalyst into line 22 or into line 16 for admixture with the oil or other vapors or gases being introduced into the reactor 10. Under these conditions the regenerated catalyst and inlet vapors would be introduced into the reactor 10 as a suspension. This suspension may be introduced into the body of the catalyst in the reactor 10 through line 22 or into the bottom portion of the reactor 10 below the grid 18.

After continued use, the catalyst becomes less active so that a certain amount of the catalyst in the system must be removed occasionally and replaced with fresh. Provision for this has not been indicated on the drawing, but the less active catalyst may be withdrawn from the system at any suitable place as, for example, from line 102.

An automatic level control device 140 is preferably provided for reactor 10 to maintain the level 28 at a desired point. The valve 13 is set to feed catalyst to the reactor 10 at a desired rate and variations in this feed are compensated for by the device 140. The control device 140 is pressure responsive and if the level 28 falls, the pressure differential between lines 142 and 144 leading to the reactor 10 will decrease and the control device 140 will move the valve 48 toward closed position to decrease the amount of catalyst withdrawn from standpipe 32. If the level 28 rises, the pressure differential between lines 142 and 144 will increase and the control device 140 will open the valve 48 wider to withdraw more catalyst through standpipe 32. The pressure responsive control 140 may also be actuated by the pressure drop across reactor 10. The pressure drop for a given level of catalyst will be known and variations from this pressure drop will be used to control valve 48. The level control device is preferably used with my process when using catalyst or contact material in powder form in reactions generally. If the density of the body 24 of dense phase catalyst decreases, the control device 140 will permit rise in the level to compensate for the lowered density.

As an alternative the level 28 in reactor 10 may be controlled by valve 13, that is the control device 140 will be associated with valve 13 rather than valve 48. The valve is set for withdrawing catalyst at a desired rate and variations in the level 28 will be compensated for by valve 13.

The level 28 in reactor 10 may be held at any desired point to give the desired results and desired extent of reaction. For example, in the catalytic cracking of hydrocarbons the extent of cracking may be controlled by the amount of catalyst in the reactor. The amount of catalyst in the reactor will be independent of slight variations in the rate of catalyst feed or oil feed. Where a high degree of cracking is desired, the level 28 in reactor 10 will be maintained at a high level and the hydrocarbon vapors or gases in passing through the reactor 10 will be contacted with a large amount of catalyst. Where less cracking is desired, the level 28 will be maintained at a lower level and the hydrocarbon vapors or gases will be contacted with a smaller amount of catalyst. The extent of reaction in other cases may be similarly controlled by varying the level of catalyst. By way of illustration, the reaction temperature may be about 700° to 1000° F. when cracking hydrocarbons.

If desired, the level 62 in the regenerator, which depends on the amount of catalyst in the system, may be automatically maintained by a level control device operating valve 130 so that the rate of addition of catalyst from hopper 114 will be equal to the rate of catalyst loss from the system.

In order to maintain a level of dense phase catalyst or contact material in the reaction vessels and remove catalyst as a dense phase from the bottom of the vessels, it is essential that the rate of catalyst feed to the reaction vessel be greater than the rate at which catalyst is carried out by the gases or vapors passing overhead. For instance, it has been found that when operating the reaction vessel at a velocity of 1.0 foot per second of the outgoing gases or vapors, the amount of catalyst carried overhead is about 5 pounds per 100 cubic feet of gas so that catalyst must be fed at a greater rate than this in order to have a level in the reaction vessel.

The amount of catalyst or solid particles carried overhead from the reaction vessels varies with the distance between the level of the dense fluidized mass and the gas outlet, the amount going overhead decreasing as the distance is increased. For example, in reactor 10 as the level 28 is lowered, and the distance from level 28 to gas outlet 36 increases, the amount of solid particles carried over with the gas or vapors and passing through line 36 is decreased.

By altering the design of the apparatus so that the solid particles from separating means 88 are returned to the body of solid particles in reaction vessel 56 instead of well 64 or from separating means 38 to the body 24 of solid materials in reaction vessel 10 instead of standpipe 32, the level of dense phase or fluidized solid particles can be maintained at a desired level at lower catalyst or solid feed rates. In this case the minimum feed rate is set for the respective reaction vessels by the pounds per hour of solid particles leaving the separating means 88 and 38.

By having the reactor 10 and regenerator 56 act as hoppers, no storage hoppers are necessary and as a result the catalyst inventory in the system is less than where storage hoppers are used.

My invention may be used where solid material in finely divided or powder form is contacted with gaseous products and the mixture passed through a treating or reaction zone to bring about physical or chemical changes in the gases or solids or both. For example, my invention may be used for separation and purification of gases by solid adsorbents and recovery of gasoline constituents from natural gas, casinghead gas or cracked refinery gas or the like.

While I have given densities of acid treated bentonite clay particles in dense phase in the reactor and regenerator and of the dispersed phase, it is to be understood that these figures will vary with the density of the catalyst or contact particles. For example, if contact particles are used which are heavier or which have a higher density than the bentonite clay particles, the dense phase and dispersed phase will have higher densities per cubic foot than the figures given for the acid treated bentonite clay particles. On the other hand if the contact particles used are lighter or have a lower density than the bentonite clay particles, the dense phase and dispersed phase will have lower densities per cubic foot than the figures given for the acid treated bentonite clay particles. The densities of the dense phase and dispersed phase will also vary with the particle size, being higher for larger particles than for smaller particles of the same material and with gas velocities substantially constant and with rate of feed of solid particles to the vessel substantially constant.

My invention may also be used in various organic reactions in which the finely divided solid acts as a catalyst, as oxidation, reduction, chlorination, hydration, dehydration and the like and more particularly various hydrocarbon reactions wherein solid catalysts or treating agents may be used such as cracking, hydrogenation, dehydrogenation, treating, polymerization, alkylation, dealkylation, isomerization, aromatization, desulfurization, reforming, hydroforming, synthesis of hydrocarbons from carbon monoxide and hydrogen, and the like.

Preferably fluidizing lines are used in connection with standpipes 12, 32 and 72 to fluidize the solid particles in the standpipe and maintain them in fluidized condition.

Return on dip pipe 92 from separating means 88 may be provided at its lower end with a valve, if desired.

While I have shown one form of apparatus for carrying out my invention and while the catalytic cracking of hydrocarbons has been specifically referred to, it is to be understood that these are by way of illustration only and various changes and modifications may be made without departing from the spirit of my invention.

I claim:

1. A process for the catalytic conversion of hydrocarbons in the gaseous state in the presence of a solid conversion catalyst of small particle size, said catalyst thereby becoming contaminated with carbonaceous material and thereafter being regenerated by the oxidation of said carbonaceous material which process comprises maintaining two separate catalyst contacting zones with one of said zones disposed vertically above the other, passing a hydrocarbon stream in gaseous state upwardly through a distributing grid member in the lower portion of the lower zone at such a rate as to maintain a dense turbulent phase of suspended catalyst solids above said grid member in said zone, passing an oxygen containing regeneration gas upwardly through a second distributing grid member in the lower portion of the upper zone at such a rate as to maintain a dense turbulent phase of suspended catalyst solids above said second grid member in the upper zone, separating contaminated catalyst solids from gases leaving the upper part of the lower zone and introducing said contaminated catalyst solids into the upper zone, separating regenerated catalyst from gases leaving the upper part of the upper zone, withdrawing regenerated catalyst as a downwardly moving aerated column from the upper zone, the column being of such height as to provide a pressure at the base thereof which is greater than the pressure in the lower zone and suspending catalyst from the base of said column in the hydrocarbon stream which is passed upwardly through the lower zone, the downwardly moving aerated column of regenerated catalyst serving as a seal to prevent the passage of hydrocarbon gas to the upper zone.

2. In a catalyst conversion system for handling powdered catalyst, a first reactor, a distributing grid in the lower portion of said reactor, means for passing gases or vapors upwardly through said distributing grid in said reactor at such rates as to maintain a dense turbulent suspended catalyst phase above said grid which is superimposed by light dispersed catalyst phase, means for withdrawing dense phase catalyst directly from the dense turbulent suspended catalyst phase, means for aerating and stripping the withdrawn catalyst while it remains in dense phase condition, a second reactor, a second distributing grid in the lower portion of said second reactor means for passing gases or vapors upwardly through said second grid and into said second reactor at such rates as to maintain a second dense turbulent suspended catalyst phase superimposed by a light dispersed catalyst phase, means for introducing into this second dense turbulent suspended catalyst phase the aerated and stripped catalyst from the first dense turbulent suspended catalyst phase, means for withdrawing dense phase catalyst directly from said second dense turbulent suspended catalyst phase, means for stripping and aerating said last-named catalyst while it remains in dense phase, means for returning last-named aerated and stripped catalyst to said first-named dense turbulent suspended catalyst phase, and means at the top of at least one reactor for knocking back catalyst from the light dispersed catalyst phase into the dense turbulent suspended catalyst phase therein.

3. In a fluid catalyst system a reactor, a standpipe with its upper end inside of said reactor and with its lower end beneath said reactor, a distributing grid in the lower portion of said reactor, means for introducing powdered catalyst into said reactor, means for introducing a suspending gas or vapor upwardly through said grid into the lower portion of said reactor at such a rate as to maintain a dense turbulent suspended catalyst phase in said reactor above said reactor and at least up to the upper end of the standpipe, a catalyst settling section at the upper end of said reactor and above the top of the standpipe for separating catalyst particles from the gases or vapors leaving the upper settling section and for returning the separated catalyst to the dense turbulent suspended catalyst phase in the reactor, means for aerating and stripping catalyst in said standpipe and means for withdrawing catalyst from the base of said standpipe.

4. The method of operating a finely-divided solids contacting system which method comprises passing a first gasiform stream upwardly through a distributing grid in the lower portion of a first contacting zone containing finely-divided solids at such a rate as to produce a first dense turbulent suspended solids phase and a light upper dispersed solids phase, passing a second gasiform stream upwardly through a second grid in the lower portion of a second contacting zone containing finely-divided solids at such a rate as to produce a second dense turbulent suspended solids phase and a light upper dispersed solids phase, withdrawing solids as a downwardly moving aerated column from said first dense phase, introducing said withdrawn solids from said column into the second dense phase, withdrawing solids as a downwardly moving aerated column from said second dense phase, returning solids from said last-named column to said first dense phase, separating solids from the light upper dispersed phase at the top of at least one of said zones and returning the separated solids directly to the dense phase in said zone and cycling solids from one of said contacting zones to a heat exchange zone and thence back to said contacting zone for controlling temperature in said contacting zone.

5. The process of converting hydrocarbon oils which comprises introducing hot regenerated catalyst at an intermediate point in a reaction zone, introducing a hydrocarbon stream at a lower point in said reaction zone and at such a rate that the vertical vapor velocity in said zone will maintain a dense catalyst phase above the point of hydrocarbon stream inlet, withdrawing spent catalyst downwardly as an aerated column from a low point in said reaction zone whereby the pressure at the base of said column is the sum of the pressure head of the column itself plus the pressure head of the dense catalyst phase above the column in the reaction zone plus the pressure at the top of said reaction zone and is greater than the pressure in the lower part of a regeneration zone, introducing catalyst from the base of said column into a regeneration zone and passing an oxygen-containing regeneration gas upwardly in said regeneration zone at such a rate as to maintain a dense catalyst phase therein, centrifugally separating catalyst particles from regeneration gases leaving said regeneration zone and returning said centrifugally separated particles to said regeneration zone, downwardly withdrawing catalyst as a second aerated column from the regeneration zone and introducing catalyst from the base of said second column to said intermediate point in said reaction zone.

6. In a catalyst conversion system for handling powdered catalyst, a first reactor, a distributing grid in the lower portion of said reactor, means for passing gases or vapors upwardly through said distributing grid in said reactor at such rates as to maintain a dense turbulent suspended catalyst phase above said grid which is superimposed by light dispersed catalyst phase, means for withdrawing dense phase catalyst directly from the dense turbulent suspended catalyst phase, means for aerating and stripping the withdrawn catalyst while it remains in dense phase condition, a second reactor, a second distributing grid in the lower portion of said second reactor, means for passing gases or vapors upwardly through said second grid and into said second reactor at such rates as to maintain a second dense turbulent suspended catalyst phase superimposed by a light dispersed catalyst phase, means for introducing into this second dense turbulent suspended catalyst phase the aerated and stripped catalyst from the first dense turbulent suspended catalyst phase, means for withdrawing dense phase catalyst directly from said second dense turbulent suspended catalyst phase, means for aerating said last-named catalyst while it remains in dense phase, means for returning last-named aerated catalyst to said first-named dense turbulent suspended catalyst phase, and means at the top of at least one reactor for knocking back catalyst from the light dispersed catalyst phase into the dense turbulent suspended catalyst phase therein.

7. In a catalyst conversion system for handling powdered catalyst, a first reactor, means for passing gases or vapors upwardly through said reactor at such rates as to maintain a dense turbulent suspended catalyst phase which is superimposed by light dispersed catalyst phase, means for withdrawing dense phase catalyst directly from the dense turbulent suspended catalyst phase, means for aerating and stripping the withdrawn catalyst while it remains in dense phase condition, a second reactor, means for passing gases or vapors upwardly through said second reactor at such rates as to maintain a second dense turbulent suspended catalyst phase superimposed by a light dispersed catalyst phase, means for introducing into this second dense turbulent suspended catalyst phase the aerated and stripped catalyst from the first dense turbulent suspended catalyst phase, means for withdrawing dense phase catalyst directly from said second dense turbulent suspended catalyst phase, means for aerating said last-named catalyst while it remains in dense phase, means for returning last-named aerated catalyst to said first-named dense turbulent suspended catalyst phase, means at the top of at least one reactor for knocking back catalyst from the light dispersed catalyst phase into the dense turbulent suspended catalyst phase therein, a separate vessel for containing make-up catalyst under pressure, means for passing a gas upwardly through said separate vessel for maintaining catalyst therein in a fluidized condition, means for removing excess fluidizing gas from the upper portion of said separate vessel, a valved outlet leading from the bottom of said separate vessel and a conduit for conducting to said second reactor catalyst withdrawn from said separate vessel through said valved outlet.

CHARLES E. JAHNIG.

REFERENCES CITED

The following references are of record in the file of this patent:

UNITED STATES PATENTS

| Number | Name | Date |
|---|---|---|
| 783,148 | Snow | Feb. 21, 1905 |
| 1,355,105 | Canon | Oct. 5, 1920 |
| 1,386,760 | Bosch | Aug. 9, 1921 |
| 1,475,502 | Manning | Nov. 27, 1923 |
| 1,803,083 | Wack | Apr. 28, 1931 |
| 1,845,058 | Pier | Feb. 16, 1932 |
| 1,972,948 | Payne | Sept. 11, 1934 |
| 1,977,684 | Lucke | Oct. 23, 1934 |
| 1,984,380 | Odell | Dec. 18, 1934 |
| 2,020,115 | Gray | Nov. 5, 1935 |
| 2,239,801 | Voorhees | Apr. 29, 1941 |
| 2,247,097 | Menshih | June 24, 1941 |
| 2,261,151 | Fast | Nov. 4, 1941 |
| 2,264,438 | Gaylor | Dec. 2, 1941 |
| 2,270,903 | Rudbach | Jan. 27, 1942 |
| 2,271,148 | Becker | Jan. 27, 1942 |
| 2,302,209 | Goodin | Nov. 17, 1942 |
| 2,303,047 | Hemminger | Nov. 24, 1942 |
| 2,304,827 | Jewell | Dec. 15, 1942 |
| 2,305,569 | Degnen | Dec. 15, 1942 |
| 2,311,564 | Munday | Feb. 16, 1943 |
| 2,325,136 | Kassel | July 27, 1943 |
| 2,325,611 | Keranen | Aug. 3, 1943 |
| 2,326,438 | Clarke | Aug. 10, 1943 |
| 2,326,705 | Thiele et al. | Aug. 10, 1943 |
| 2,331,433 | Simpson et al. | Oct. 12, 1943 |
| 2,451,803 | Campbell et al. | Oct. 19, 1948 |
| 2,488,027 | Page | Nov. 15, 1949 |
| 2,488,028 | Scheineman | Nov. 15, 1949 |
| 2,488,029 | Scheineman | Nov. 15, 1949 |
| 2,488,031 | Gunness | Nov. 15, 1949 |

FOREIGN PATENTS

| Number | Country | Date |
|---|---|---|
| 268,188 | Great Britain | Mar. 31, 1927 |
| 533,037 | Germany | Sept. 8, 1931 |